United States Patent [19]

Nagato

[11] Patent Number: 5,329,584
[45] Date of Patent: Jul. 12, 1994

[54] INTERFACE CIRCUIT TO QUICKLY ESTABLISH A LOOP CURRENT

[75] Inventor: Takashi Nagato, Kawasaki, Japan

[73] Assignee: Fujitsu Limited, Japan

[21] Appl. No.: 991,459

[22] Filed: Dec. 16, 1992

[30] Foreign Application Priority Data

Dec. 20, 1991 [JP] Japan .................................. 3-338349

[51] Int. Cl.⁵ .............................................. H04M 3/22
[52] U.S. Cl. .................................. 379/382; 379/377; 379/399
[58] Field of Search ............... 379/376, 377, 378, 379, 379/382, 399, 413; 370/71

[56] References Cited

U.S. PATENT DOCUMENTS

| | | | |
|---|---|---|---|
| 3,748,401 | 7/1973 | Pesz et al. | 379/382 |
| 4,015,091 | 3/1977 | Rao et al. | 379/418 |
| 4,025,729 | 5/1977 | Stone | 370/71 |
| 4,282,407 | 8/1981 | Stiefel | 379/377 |
| 4,500,754 | 2/1985 | Mackey | 379/399 |
| 4,535,202 | 8/1985 | Meunier | 379/379 |
| 4,958,371 | 9/1990 | Damoci et al. | 379/377 |
| 5,020,100 | 5/1991 | Gardiner | 379/377 |
| 5,138,658 | 8/1992 | Carter et al. | 379/378 |
| 5,140,631 | 8/1992 | Stahl | 379/379 |

FOREIGN PATENT DOCUMENTS 50644 2/1990 Japan .................................. 379/382

Primary Examiner—James L. Dwyer
Assistant Examiner—Scott L. Weaver
Attorney, Agent, or Firm—Greer, Burns & Crain, Ltd.

[57] ABSTRACT

According to the invention, an interface circuit for quickly establishing a DC loop current in response to off-hook detection is provided by a circuit which uses a transistor, where its collector electrode is connected to the first one of the telephone lines; an emitter resistor connected between an emitter electrode of the transistor and the second one of the telephone lines; a bias resistor having a first terminal connected to the collector electrode; a Zener diode connected between a second terminal of the bias resistor and the second line; a first capacitor connected in parallel to the constant-voltage means; switching means connected between the second terminal of the bias resistor and a base electrode of the transistor for the switching means to be conductive in response to an off-hook signal; and charging means, typically formed of a series connection of a capacitor, a resistor and a Zener diode, connected in parallel to the bias resistor so as to allow a current to flow through the series connection to charge the first capacitor only during a transient of applying a Dc voltage from the telephone lines onto the transistor.

8 Claims, 5 Drawing Sheets

5,329,584

INTERFACE CIRCUIT TO QUICKLY ESTABLISH A LOOP CURRENT

BACKGROUND OF THE INVENTION

1. Field of the invention

This invention relates to an interface circuit of quick response type used in a Central Office Terminal (referred to hereinafter as COT) connected with a switching station.

2. Description of the Related Arts

In an interface circuit provided in a COT connected with a switching station SW, when a subscriber picks up the receiver of his telephone set TEL in response to the ring, a loop circuit, i.e., a speech path, has to be quickly established with the switching station.

However, if the COT is distantly located from the switching station the resistance of the telephone line L becomes so large as to cause a delay of a ring-trip operation in establishing the speech path, due to an increase of time constant of the interface circuit.

SUMMARY OF THE INVENTION

It is a general object of the invention to provide a simple and inexpensive interface circuit which allows a quick ring-trip operation to form a speech path.

An interface circuit of the present invention comprises: a transistor for allowing a DC current supplied from the telephone lines to flow therethrough, where its collector electrode is connected to the first one of the telephone lines; an emitter resistor connected between an emitter electrode of transistor and the second one of the telephone lines; a bias resistor having a first terminal connected to the collector electrode; constant-voltage means connected between a second terminal of the bias resistor and the second line; a first capacitor connected in parallel to the constant-voltage means; switching means connected between the second terminal of the bias resistor and a base electrode of the transistor for the switching means to be conductive in response to an off-hook signal; and charging means, connected in parallel to the bias resistor so as to allow a current to flow therein to charge the first capacitor only during a transient of applying a DC voltage from the telephone lines onto the transistor.

The above-mentioned features and advantages of the present invention, together with other objects and advantages, which will become apparent, will be more fully described hereinafter, with reference being made to the accompanying drawings which form a part hereof, wherein like numerals refer to like parts throughout.

A BRIEF DESCRIPTION OF THE DRAWINGS

FIG. 1 schematically illustrates a block diagram to explain where channel circuits including interface circuits incorporating the present invention are located relative to a telephone network;

FIG. 2 schematically illustrates a circuit configuration of an interface circuit and its related circuits of the present invention;

Figure 5:
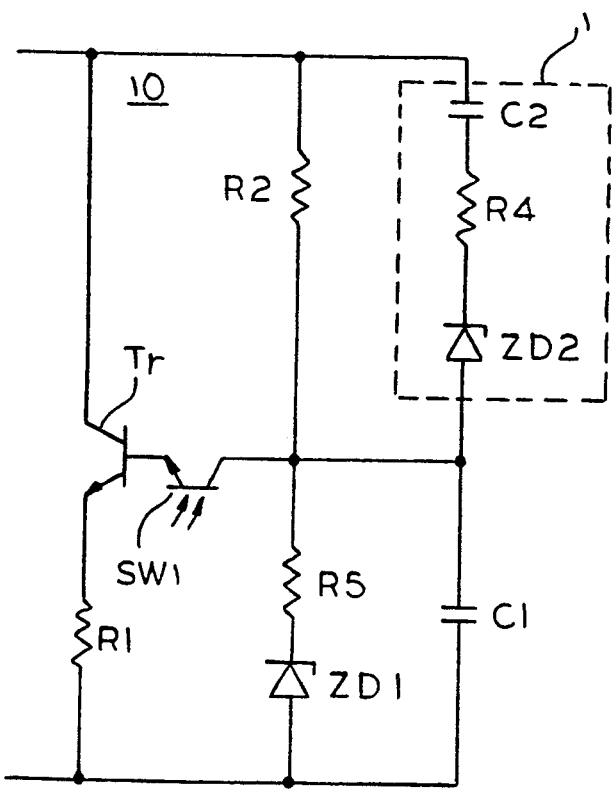
Figure 6:
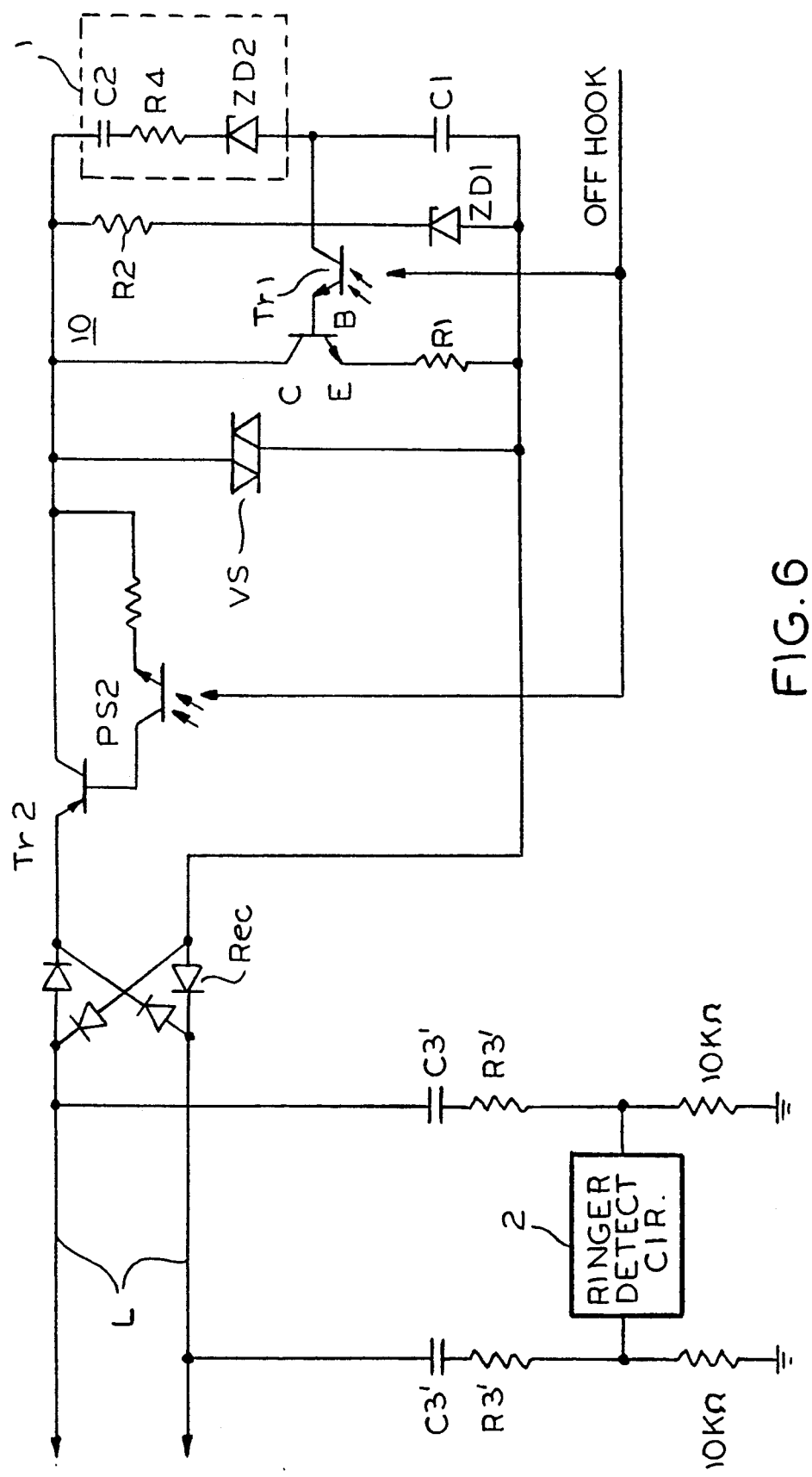

FIG. 5 schematically illustrates a second preferred embodiment of the present invention; and FIG. 6 schematically illustrates a third preferred embodiment of the present invention.

DESCRIPTION OF THE PREFERRED EMBODIMENT

Figure 1:
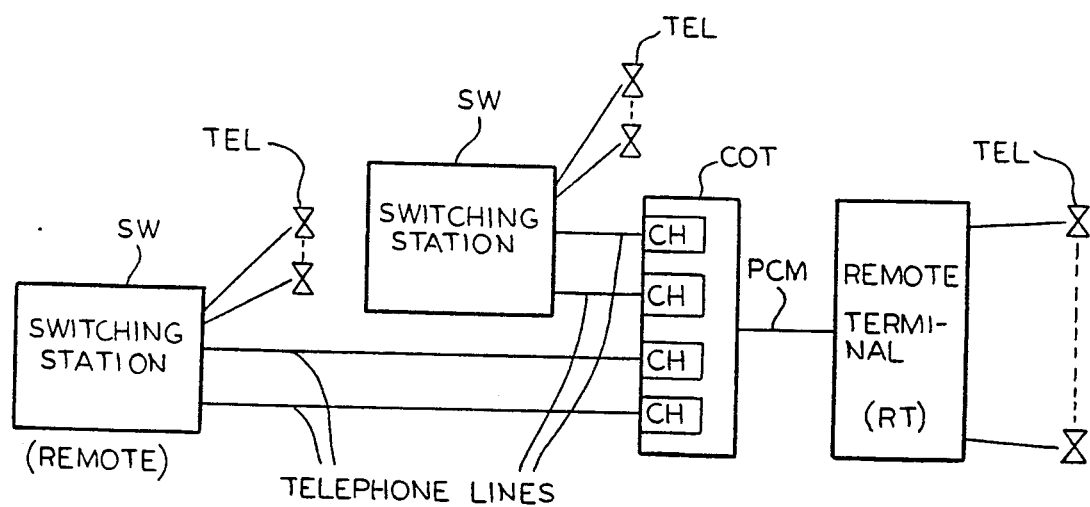

Channel circuits CH including an interface circuit, which relates to the present invention, are shown in a block diagram of FIG. 1. The switching station SW is connected via telephone lines with COT. Plural channel circuits CH in the COT receive the telephone lines, respectively. The COT is further connected with a remote terminal (referred to hereinafter as RT) via a transmission line on which plural telephone signals are multiplexed, such as a 24-channel PCM (Pulse Code Modulation) line. The RT has plural channel circuits CH to each of which subscriber lines from subscriber telephone terminals TEL are connected, respectively.

Figure 2:
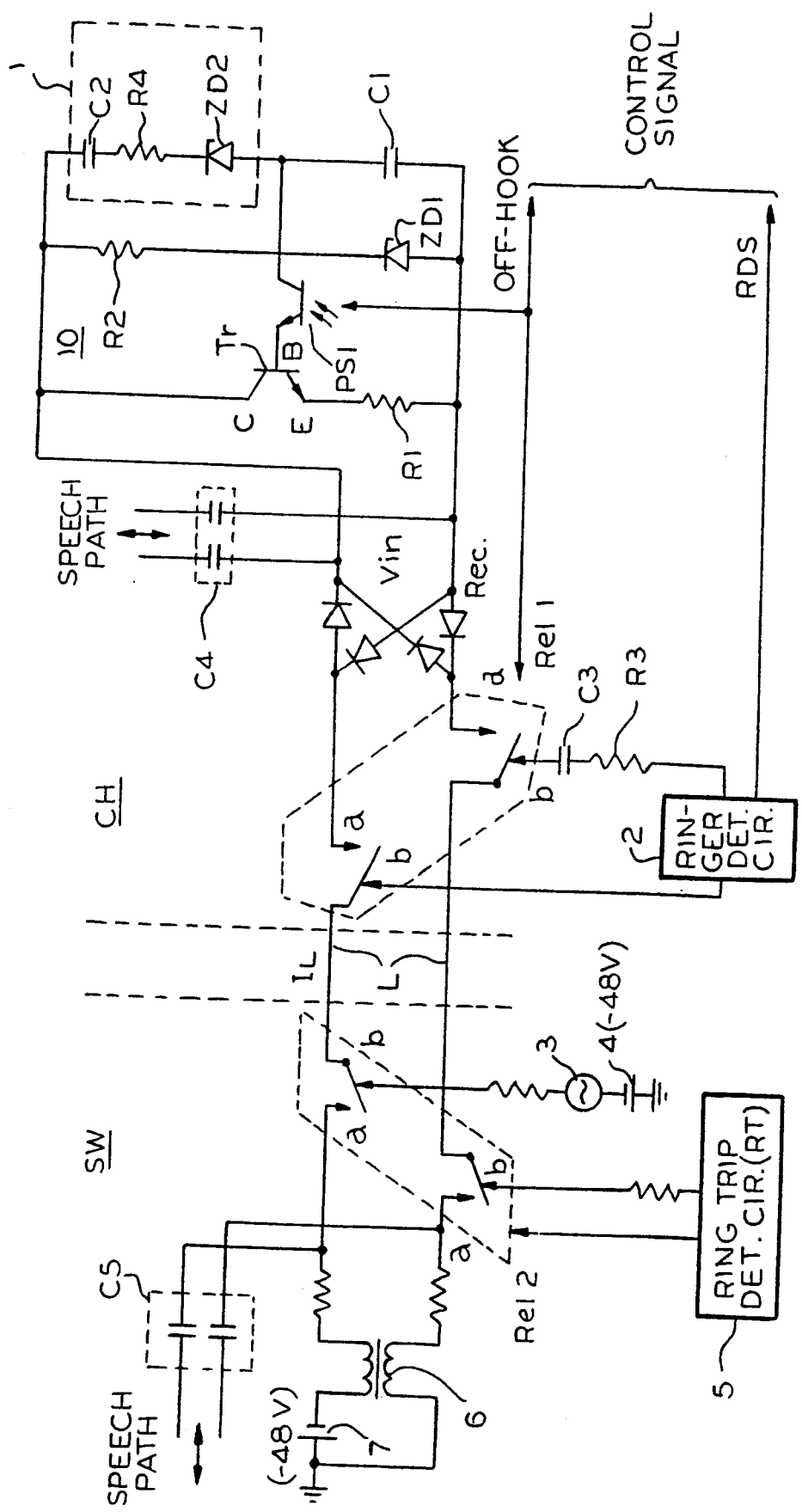
Figure 3:
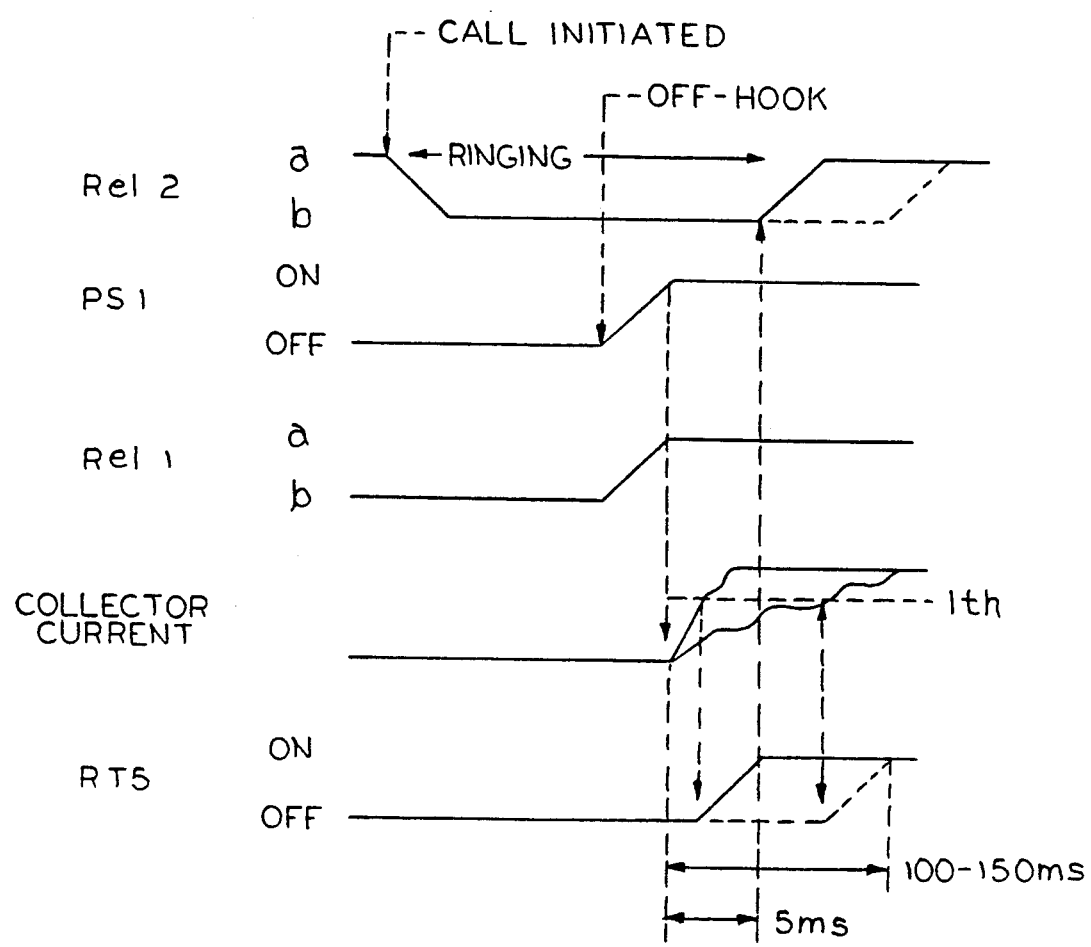
FIG. 3 illustrates timing charts of the FIG. 2 circuit configuration.

FIG. 2 illustrates a part of channel CH which converts speech signals to/from PCM signals and includes a ringer detecting circuit 2 and an interface circuit 10 to detect ON/OFF HOOK state of the line to/from the switching station, a part of switching station SW connected thereto, and a pair of telephone lines L connected therebetween. In FIG. 3 there is shown a timing chart for the FIG. 2 circuit. In FIG. 2, first and second relays, respectively designated Rel 1 and Rel 2, are drawn for an OFF-HOOK state (on position b, respectively).

When a call is originated from the switching station side, second relay Rel 2 having been on position a to wait for a call is actuated by a control signal (not shown in the figure) so as to turn from position a to position b. Then, a ringer signal having typically 100 Vrms amplitude generated in a ringer 3 and a −48 V DC (direct current) voltage supplied from a first battery feed 4 are applied onto telephone lines L.

Then, interface circuit 10 of COT receiving the lines L has first relay Rel 1 on its position b. Therefore, ringer detecting circuit 2 detects the ringer signal via a capacitor C3 of, for example 2 μF and a resistor R3 of, for example 5 kΩ, so as to output a ringer detection signal RDS to the subscriber side.

There is further provided in the interface circuit a transistor Tr having an emitter resistor R1 of, for example 200Ω. A parallel connection of a capacitor C1 of, for example 3.3 μF, and a first zener diode ZD1 having a zener voltage, for example 7 V, is connected between the bias resistor R2 and a second terminal of emitter resistor R1 opposite from a first terminal connected to the emitter. A bias resistor R2 of, for example 400 kΩ supplies from collector of the transistor a bias current via first photo switch PS1 to its base as well as a zener current to first zener diode ZD1.

When a subscriber hearing the ringer sound initiated by the ringer detection signal RDS picks up his telephone set, a control signal OFF-HOOK indicating the OFF-HOOK state is output so as to actuate first photo switch PS1 as well as first relay Rel 1 to turn from its position b to position a so that a sum of the ringer AC (alternating current) and the DC battery feed voltage is rectified by rectifier bridge Rec and then is input as an input voltage Vin to the transistor circuit. Rectifier bridge Rec allows the transistor circuit to receive from telephone lines L any polarity of DC voltages sent from first and second battery feeds 4 and 7.

First photo switch PS1 thus actuated to be conductive clamps the gate of transistor Tr to the 7 V Zenor voltage of first zener diode ZD1. Due to the substantially constant zener voltage applied to the base of transistor Tr the collector current of transistor Tr is also substantially constant without being affected by the variation of the input voltage Vin, i.e. collector voltage. The collector current flows also through a ring-trip detector circuit 5. When this current reaches a predetermined threshold level $I_{th}$, for example 20 mA, ring-trip detecting circuit RT trips second relay Rel 2 to turn to its position a. Thus, a loop is established via a second battery feed 7 of −48 V, an connection monitoring transformer 6, telephone lines L, transistor Tr and its emitter resistor R1. Now, speech path is also established, such that speech signal passes through capacitors C5, telephone lines L and capacitors C4, without being damped by transistor Tr absorbing the substantially DC current only, but none of AC component. Thus, the interface circuit allows to separate the speech signal from the DC current.

COT is generally installed in the vicinity of the switching station. However, in the case where the COT has to be located as distant as 10 km from the switching station SW, the resistance value $R_L$ of telephone lines L becomes as high as 2 kΩ. Then, in the OFF-HOOK state the input voltage Vin is dropped by the line resistance $R_L$, whereby the voltage across first zener diode ZD1, i.e. the base voltage, may also be dropped lower than its zener voltage so as not to be clamped to a constant voltage. In this state, the base voltage is substantially proportional to the input voltage Vin carrying the speech signal. Then, in order to keep the base voltage free from AC component included in the input voltage, in other words, to prevent the transistor from absorbing the speech signal, there has been provided first capacitor C1 in parallel to first zener diode ZD1. Owing to a low-pass filter function of bias resistor R2 and first capacitor C1, the speech signal that is an AC does not appear on the base electrode even at the base voltage lower than the zener voltage, whereby the transistor allows only the substantially DC component to flow therethrough.

At the moment when the DC battery feed voltage and the ringer signal are applied from first battery feed 4 and ringer 3 via rectifier bridge Rec to bias resistor R2 the voltage across first capacitor C1 is zero and then gradually rises due to the high time constant caused by the resistor R2 of as high as 400 kΩ and 3.3 μF capacitor C1.

In order to quickly charge up first capacitor C1 there is provided, according to the present invention, a series circuit 1 composed of a charging capacitor C2 of, for example 6.8 μF, a charging resistor R4 of, for example 100Ω and a second zener diode ZD2 of, for example 6 V zener voltage, in parallel to bias resistor R2. During a transient period after the moment when first relay Rel 1 turned to its position a, a charging current much larger than the current flowing in bias resistor R2 flows through series circuit 1 due to the low impedance of series circuit 1 so as to quickly charge up first capacitor C1. Consequently, a quickly rising capacitor voltage, that is the base voltage, allows transistor Tr to quickly build up its collector current i.e. a ring-trip current, to flow therethrough as shown as $I_L$ by a solid line in FIG. 3. When the ring-trip current reaches a predetermined threshold level, for example 20 mA, only about 5 ms after the OFF-HOOK signal the ring-trip operation is completed to actuate second relay Rel 2, so that the loop is established.

After the transient period the charging current is prevented by the zener diode whose voltage is now below its breakdown voltage; thereafter, the charge in charging capacitor C2 discharges as a forward current of second Zenor diode ZD2. Because input voltage Vin to interface circuit 10 is a full rectification of the sum of the DC 48 V and the 100 Vrms AC ringer signal, there is seen in FIG. 3 some ripple component in the collector current.

If the series circuit 1, that is the quick charging circuit, is not provided, capacitor C1 is slowly charged as describe above. Thus, the base voltage slowly rises. Consequently, the collector current is delayed to reach the trip level as indicated with a dotted curve, causing the ring-trip operation to delay for 100 to 150 ms, which is undesirable for a satisfactory telephone communication.

Figure 4:
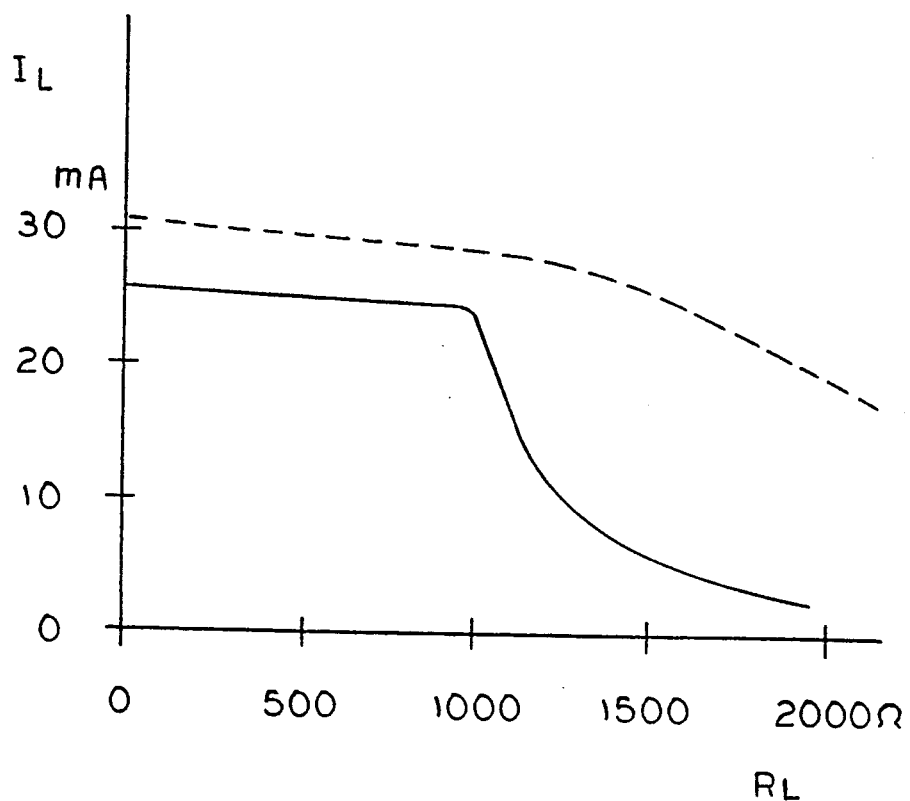
FIG. 4 illustrates a graph showing loop current versus telephone line resistance.

FIG. 4 illustrates a graph of the loop current value $I_L$ versus the telephone line resistance $R_L$, after the transient period is finished. Emitter voltage of transistor TR is determined by the division of the −48 V battery feed voltage by the ratio of telephone line resistance $R_L$ and emitter resistance R1. Accordingly, the base voltage that is a little higher than the emitter voltage is also determined by the telephone line resistance $R_L$. When the telephone line resistance $R_L$ reaches a certain value, such as almost 1000 Ω, the base voltage, i.e. the voltage across first zener diode ZD1 becomes lower than its zener voltage, where first Zenor diode ZD1 no longer acts as a constant voltage means but first capacitor C1 absorbs the AC component of the base voltage. Consequently, the solid curve in FIG. 4 bends at about 1000 Ω, where the collector current drastically drops beyond the bending point resulting in lowering the upper limit of the telephone line resistance $R_L$, i.e. the telephone line length.

Referring to FIG. 5 a second preferred embodiment of the present invention is hereinafter described. In order to improve thus lowered limit of telephone line length a resistor R5 having a resistance value of, for example 1.5 kΩ is added in series to first zener diode ZD1' where the zener voltage is modified to, for example 6 V, as well as bias resistor R2' is 44 kΩ. Resistance value of bias resistor R2' is chosen so as to provide a proper voltage to the base. Effect of resistor R5 is shown with a dotted curve in FIG. 4, where it is observed that the collector current keeps a high level even beyond 1000 Ω of telephone line resistance $R_L$.

Referring to FIG. 6 a third preferred embodiment of the present invention is hereinafter described. The first switch of first relay Rel 1 in FIG. 2 is replaced with a second photo switch PS2 formed of a Darlington connection of a second transistor Tr2 and a second photo switch PS2 providing a bias current via a resistor R6 to a base of second transistor Tr2. The second switch of first relay Rel 1 is replaced with a permanent connection of ringer signal detecting circuit 2. Second photo switch PS2 is actuated by the control signal OFF-HOOK also actuating first photo switch PS1. Input terminals of ringer signal detecting circuit 2 are connected via a coupling capacitor C3' of, for example 0.047 μF, and a coupling resistor R3' of, for example 100 kΩ, respectively to both the telephone lines L. Input terminals of ringer signal detection circuit 2 are floated from the earth via resistors of 10 kΩ, respectively. Due to the high impedance values of the coupling resistors R3' and coupling capacitors C3' a varistor VS having a breakdown voltage of, for example 70

V, is provided between two telephone lines at the input to the transistor circuit. Rectifier bridge Rec is provided before the transistor switch.

Though in the above preferred embodiments the charging circuit 1 is formed of a series connection of a capacitor, a resistor and a zener diode, it is apparent that the charging circuit 1 can be formed of other configuration than that referred to, as long as the charging circuit functions such that the circuit allows a large current to flow therein only during a transient period immediately after the application of the input voltage, that is, when the voltage across the charging circuit 1 is larger than a predetermined value.

Though in the above preferred embodiments the interface circuit connected to a central switching station is referred to, the present invention can be embodied in an interface circuit to be connected with other terminals.

The many features and advantages of the invention are apparent from the detailed specification and thus, it is intended by the appended claims to cover all such features and advantages of the methods which fall within the true spirit and scope of the invention. Further, since numerous modifications and changes will readily occur to those skilled in the art, it is not detailed to limit the invention and accordingly, all suitable modifications or equivalents may be resorted to, falling within the scope of the invention.

What I claim is:

1. An interface circuit, for receiving a pair of telephone lines having a first line and a second line in a telephone switching system, and for providing a DC current to actuate a ring-trip circuit upon an Off-hook state, comprising:
    a transistor for allowing a DC current supplied from the telephone lines to flow therethrough, said transistor having a collector electrode connected to said first line;
    an emitter resistor connected between an emitter electrode of said transistor and said second line;
    a bias resistor having a first terminal connected to said collector electrode;
    constant-voltage means connected between a second terminal of said bias resistor and said second line;
    a first capacitor connected in parallel to said constant-voltage means;
    conductive means connected between said second terminal of said bias resistor and a base electrode of said transistor, for conducting a voltage from said constant voltage means to said base electrode; and
    a charging circuit, connected in parallel to said base resistor, said charging circuit having a current path having a lower impedance to a voltage transient on said collector electrode than an impedance of said bias resistor, said current path also having a higher impedance to a steady state voltage on said collector electrode than said impedance of said bias resistor.

2. An interface circuit as recited in claim 1, wherein said constant-voltage means comprises a Zener diode.

3. An interface circuit as recited in claim 2, wherein said constant-voltage means further comprises a resistor in series to said Zener diode.

4. An interface circuit as recited in claim 1, wherein said charging circuit comprises a series connection of a Zener diode, a second capacitor and a resistor.

5. An interface circuit as recited in claim 1, wherein said transistor and said emitter resistor form a transistor circuit, said interface circuit further comprising a rectifier bridge between said telephone lines and said transistor circuit.

6. An interface circuit as recited in claim 5, further comprising transfer switches, coupled between said telephone lines and said rectifier bridge, and a ringer detecting circuit, coupled to said transfer switches, said transfer switches decoupling said telephone lines from said ringer detecting circuit and coupling said telephone lines to said rectifier bridge in response to a control signal indicating an off-hook state.

7. An interface circuit as recited in claim 1, wherein said constant-voltage means comprises a first Zener diode and said charging circuit comprises a series connection of a second Zener diode, a second capacitor, and a resistor.

8. An interface circuit as recited in claim 1, wherein said conductive means includes switching means for selectively conducting the voltage from said constant voltage means in response to an off-hook signal indicating said off-hook state.

* * * * *